(12) United States Patent
Forestier et al.

(10) Patent No.: US 8,369,008 B2
(45) Date of Patent: Feb. 5, 2013

(54) COMPACT DUAL-FIELD IR2-IR3 IMAGING SYSTEM

(75) Inventors: Bertrand Forestier, Paris (FR); Paul Jougla, Paris (FR)

(73) Assignee: Thales, Neuilly sur Seine (FR)

( * ) Notice: Subject to any disclaimer, the term of this patent is extended or adjusted under 35 U.S.C. 154(b) by 681 days.

(21) Appl. No.: 12/518,598

(22) PCT Filed: Dec. 3, 2007

(86) PCT No.: PCT/EP2007/063180
§ 371 (c)(1),
(2), (4) Date: Jun. 10, 2009

(87) PCT Pub. No.: WO2008/071579
PCT Pub. Date: Jun. 19, 2008

(65) Prior Publication Data
US 2010/0033578 A1    Feb. 11, 2010

(30) Foreign Application Priority Data
Dec. 13, 2006  (FR) ...................................... 06 10871

(51) Int. Cl.
| | |
|---|---|
| *G02B 13/14* | (2006.01) |
| *G02B 15/14* | (2006.01) |
| *G02B 15/20* | (2006.01) |
| *G02B 9/12* | (2006.01) |
| *G02B 23/00* | (2006.01) |

(52) U.S. Cl. ........ 359/354; 359/353; 359/355; 359/356; 359/357

(58) Field of Classification Search .................. 359/362, 359/363, 364, 365, 366, 353–357
See application file for complete search history.

(56) References Cited

U.S. PATENT DOCUMENTS 4,600,265 A *  7/1986  Norrie ........................... 359/351
4,659,171 A *  4/1987  Neil .............................. 359/354
(Continued)

FOREIGN PATENT DOCUMENTS

| FR | 2623298 | 5/1998 |
|---|---|---|
| FR | 2760924 | 9/1998 |
| WO | WO 99/59015 | 11/1999 |

OTHER PUBLICATIONS

Akram, M. N., "Design of a Dual Field-of-View Optical System for Infrared Focal-Plane Arrays", Proceedings of the SPIE, SPIE, Bellingham, VA, UA, vol. 4767, 2002, pp. 13-23, XP002446799, ISBN: 0277-786X.

*Primary Examiner* — David Czekaj
*Assistant Examiner* — David N Werner
(74) *Attorney, Agent, or Firm* — Lowe Hauptman Ham & Berner, LLP

(57) ABSTRACT

The invention relates to a dual-field (NF and WF) imaging system comprising an optronic detector (1) and an optical combination of narrow-field focal length $F_{NF}$ having, an optical axis a front lens, a narrow-field entrance pupil situated in the vicinity of the front lens, a real wide-field entrance pupil, that is to say situated upstream of the front lens, an intermediate focal plane (IFP). The optical combination has, on the optical axis, the following refractive groups: a convergent front group G1 of focal length F, where $F<F_{NF}/2$, this group G1 comprising the front lens, a divergent field-change group G2 that can move along the optical axis, this group being situated upstream of the IFP in NF configuration and downstream of the IFP in WF configuration, a relay group G3 imaging the IFP on the focal plane of the detector. The imaging system has a cooled IR2/IR3 detector and since the refractive groups have lenses, at least three different materials including $CaF_2$ are used for the lenses of the front group G1.

16 Claims, 3 Drawing Sheets

U.S. PATENT DOCUMENTS

| | | | |
|---|---|---|---|
| 5,180,912 A * | 1/1993 | McEwen et al. | 250/234 |
| 5,291,327 A * | 3/1994 | McEwen | 359/209.1 |
| 5,363,235 A * | 11/1994 | Kiunke et al. | 359/365 |
| 5,365,235 A * | 11/1994 | Kennedy et al. | 340/10.34 |
| 5,479,016 A * | 12/1995 | Curry et al. | 250/334 |
| 5,691,802 A * | 11/1997 | Takahashi | 355/53 |
| 5,774,179 A * | 6/1998 | Chevrette et al. | 348/218.1 |
| 5,798,875 A * | 8/1998 | Fortin et al. | 359/813 |
| 5,999,310 A * | 12/1999 | Shafer et al. | 359/351 |
| 6,091,551 A * | 7/2000 | Watanabe | 359/676 |
| 6,181,486 B1 * | 1/2001 | Forestier et al. | 359/738 |
| 6,999,243 B2 * | 2/2006 | Chipper | 359/690 |
| 7,042,646 B2 * | 5/2006 | Colandene | 359/626 |
| 7,859,747 B2 * | 12/2010 | Hiraiwa et al. | 359/356 |
| 2004/0195509 A1 * | 10/2004 | Sundaram et al. | 250/338.1 |
| 2005/0264873 A1 * | 12/2005 | Hall et al. | 359/357 |
| 2006/0028713 A1 * | 2/2006 | Hall | 359/357 |
| 2006/0158719 A1 * | 7/2006 | Blechinger | 359/362 |
| 2006/0245046 A1 * | 11/2006 | Bergeron et al. | 359/366 |
| 2007/0183024 A1 * | 8/2007 | Tejada | 359/356 |
| 2010/0208372 A1 * | 8/2010 | Heimer | 359/834 |

* cited by examiner

COMPACT DUAL-FIELD IR2-IR3 IMAGING SYSTEM

CROSS-REFERENCE TO RELATED APPLICATIONS

The present application is based on International Application No. PCT/EP2007/063180, filed on Dec. 3, 2007, which in turn corresponds to French Application No. 0610871, filed on Dec. 13, 2006, and priority is hereby claimed under 35 USC §119 based on these applications. Each of these applications are hereby incorporated by reference in their entirety into the present application.

TECHNICAL FIELD

The field of the invention is that of compact NF (narrow-field) WF (wide-field) infrared systems.

BACKGROUND OF THE INVENTION

An NF (3°×2.25°) and WF (9°×6.75°) camera open at F/2.7 with a narrow-field focal length $F_{NF}$ equal to approximately 180 mm, wide-field focal length $F_{WF}$ equal to approximately 60 mm, fitted with a multiple quantum well IR3 (7.5-10 µm) matrix detector is known.

The photometric behavior of this camera is optimized for thermal infrared. Specifically:
- the aperture diaphragm is materialized by the cold screen 3 of the detector 1 (represented in FIG. 1) protected by its window 2,
- there is no vignetting because the only element limiting the beams is the aperture diaphragm.

This camera is very compact. Specifically:
- the path L of the beam along the optical axis between the entrance refractive surface and the focal plane (the detector 1) is less than $F_{NF}/1.2$,
- the section of the duct occupied by the optical beams is less than $F_{NF}/2.5$ between a plane situated at $F_{NF}$ mm upstream of the entrance refractive surface and the focal plane.

This compactness is obtained by virtue of:
- a narrow-field entrance pupil situated in the vicinity of the front lens: this feature requires the presence of an IFP (Intermediate Focal Plane) in the optical combination,
- a real wide-field entrance pupil, that is to say situated upstream of the front lens.

The optical combination of this camera comprises the following refractive groups described with reference to FIG. 1:
a. a convergent front group G1 of focal length F, where $F<F_{NF}/2$, therefore extremely open,
b. a divergent field-change group G2 that can move along the optical axis; this group is situated upstream of the IFP in NF configuration and downstream of the IFP in WF configuration,
c. a relay group G3 imaging the IFP on the focal plane of the detector.

The group G1 is achromatized in the IR3 band by virtue of one of the conventional sequences Ge(+)/ZnSe(−) or Ge(+)/ZnS(−) or Ge(+)/DOE(+), with Ge for germanium, ZnSe for zinc selenide, ZnS for zinc sulfide, DOE for diffractive optical element, + for convergent and − for divergent.

The object of the invention is to be able to use such a camera and more generally an imaging system also in the IR2 band (3.5-5 µm) with a single detector. The 2 bands are however not used simultaneously: the useful band is selected by adjusting the polarization of the detector.

The existing camera, and more precisely the front group G1, has considerable chromatic aberration in IR2 which compromises its use in this spectral band.

SUMMARY OF THE INVENTION

The object of the invention is to obtain a compact dual-field IR2-IR3 imaging system that does not have the abovementioned disadvantages.

The invention is based on the use for the lenses, notably those of the front group, of a triplet of materials suited to the two spectral bands. The triplets used contain $CaF_2$, commonly called fluorine; they are triplets ZnSe(+)/Ge(−)/$CaF_2$(−) or ZnS(+)/Ge(−)/$CaF_2$(−).

The subject of the invention is a dual-field (NF and WF) imaging system having an optronic detector and an optical combination of narrow-field focal length $F_{NF}$, on an optical axis. The optical combination has a front lens, a narrow-field entrance pupil situated in the vicinity of the front lens, a real wide-field entrance pupil, that is to say situated upstream of the front lens, and an intermediate focal plane (IFP).

The optical combination has, on the optical axis, the following refractive groups:
- a convergent refractive front group G1 of focal length F, where $F<F_{NF}/2$, this group G1 comprising the front lens,
- a divergent field-change group G2 that can move along the optical axis, this group being situated upstream of the IFP in NF configuration and downstream of the IFP in WF configuration,
- a relay group G3 imaging the IFP on the focal plane of the detector.

The detector is a cooled IR2/IR3 detector, and in that at least three different materials including $CaF_2$ are used for the lenses of the refractive front group.

The invention makes it possible to reduce the power of the lenses and therefore their number while retaining a good optical quality, that is to say a good MTF. This then gives a compact dual-field IR2-IR3 imaging system.

Preferably, the lenses of the refractive front group G1 are based on triplets ZnSe(+)/Ge(−)/$CaF_2$(−) or ZnS(+)/Ge(−)/$CaF_2$(−).

According to one feature of the invention, the relay G3 comprises at least one diffractive lens (L3A).

According to another feature of the invention, the detector is a matrix or linear multiple quantum well detector.

Advantageously, since the imaging system has a cold screen, the latter is used as an aperture diaphragm and all vignetting is prevented because only this diaphragm limits the optical beams.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
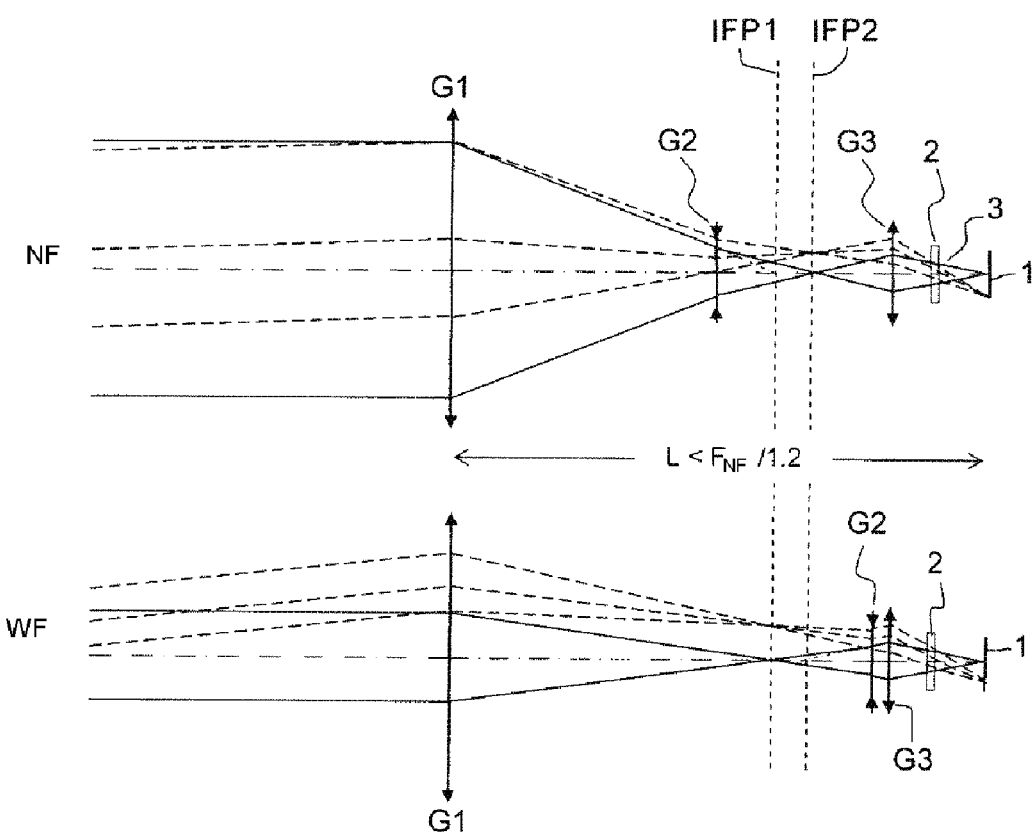
FIG. 1 already described represents schematically the optical combination of a compact NF and WF camera according to the prior art.

The functions of the various elements of the optical combination of the imaging system according to the invention will now be described. These elements are generally identical to those of the camera described with reference to FIG. 1.

The refractive front group G1 images the scene on an intermediate focal plane IFP1.

This intermediate image, which is virtual in narrow-field mode and real in wide-field mode, is taken by the divergent group G2 (preferably comprising a single lens L2), which gives an image on a second intermediate image plane IFP2, which is real in narrow-field mode and virtual in wide-field mode. The divergent lens L2 is placed before the intermediate image planes IFP1 and IFP2 in narrow-field mode, after the intermediate image planes IFP1 and IFP2 in wide-field mode. The two planes IFP1 and IFP2 are positioned in the same location for the two narrow-field or wide-field configurations. The divergent lens images the first plane IFP1 onto the second IFP2 with a magnification of $\sqrt{(F_{NF}/F_{WF})}$ in narrow-field mode, and of $1/\sqrt{(F_{NF}/F_{WF})}$ in wide-field mode. This function makes it possible to have a narrow-field focal length $F_{NF}/F_{WF}$ times larger than the wide-field focal length.

The second focal plane IFP2 is then taken by the relay group G3 of magnification of between approximately 1.3 and 1.5. Its object plane is real.

Figure 2:
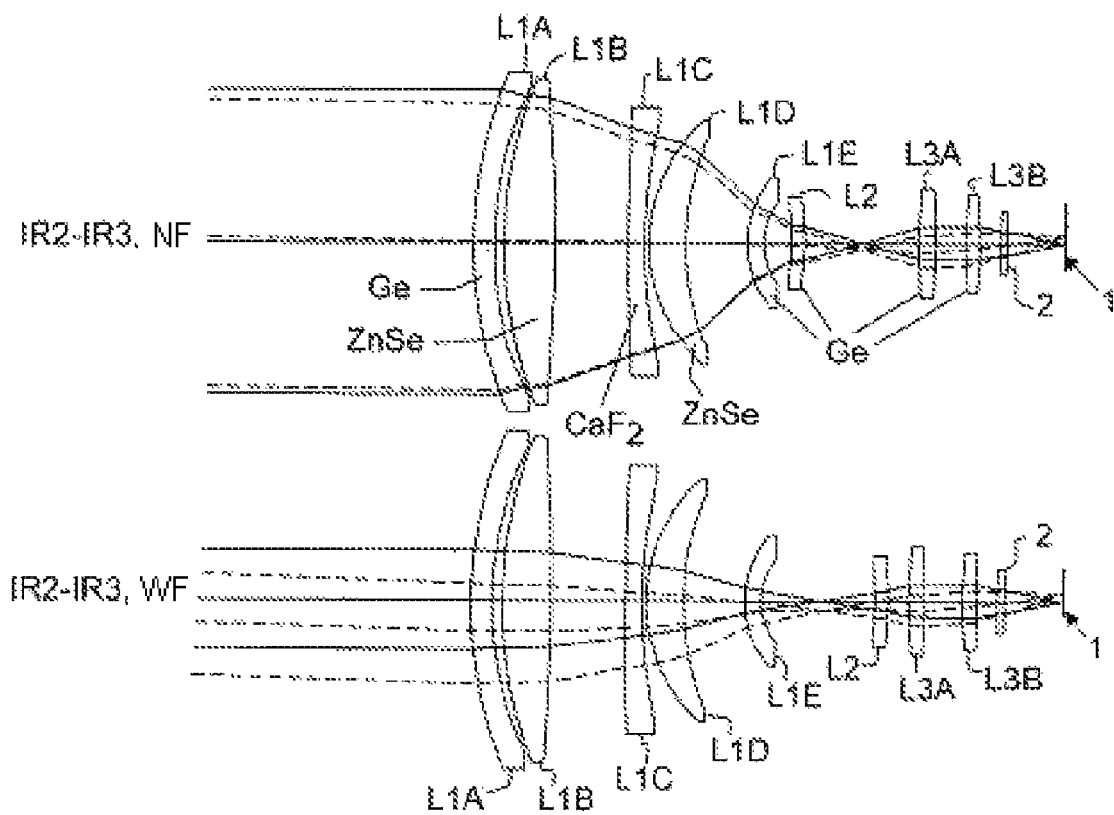
FIG. 2 represents schematically one embodiment of an imaging system according to the invention in NF and WF mode.

The relay group G3 preferably comprises 2 lenses L3A and L3B as shown in FIG. 2.

Since the interband chromatism is not corrected, the IR2 and IR3 intermediate focal planes of the front objective are not superposed. The group G2, that can move on the axis in order to allow the change of field, also makes it possible to refocus the image onto the detector when the user changes spectral band.

The axial movement of the group G2 also makes it possible to provide refocusing of the image when the temperature inside the imaging system changes or in order to observe at closer quarters.

In order to refine the thermal refocusing, at closer quarters or when there is a change of spectral band, one of the lenses of the group G3 (preferably the lens L3A) may also be made movable on the axis.

L3B is preferably a microscanning lens which makes it possible to translate the image of the scene on the detector by ½ pixel. This function makes it possible to increase the resolution of the imaging system.

This configuration makes it possible to obtain an NF-WF imaging system; the narrow-field entrance pupil is situated in the vicinity of the front lens, and the wide-field entrance pupil is real, that is to say situated upstream of the front lens, which makes it easier to install the imaging system in a sighting periscope system because this eliminates the risk of vignetting of the WF beams.

In this architecture, the chromatic aberrations of the front group G1 are the largest.

Recalling the chromatism equations, consider an optical module, of power $\phi$, the axial chromatism of which it is desired to correct in each of the two spectral bands. This module comprises three lenses each made in a different material. Let A, B and C be the three lenses and let:

$$\begin{cases} \phi A, \phi B, \phi C \text{ be the respective powers of the 3 lenses,} \\ v1A \text{ and } v2A \text{ be the } IR2 \text{ and } IR3 \text{ constringencies of the material } A, \\ v1B \text{ and } v2B \text{ be the } IR2 \text{ and } IR3 \text{ constringencies of the material } B, \\ v1C \text{ and } v2C \text{ be the } IR2 \text{ and } IR3 \text{ constringencies of the material } C. \end{cases}$$

The equations for the paraxial correction of the chromatism of a triplet are as follows:

$$\begin{cases} \phi = \phi A + \phi B + \phi C \\ \phi A/v1A + \phi B/v1B + \phi C/v1C = 0 & \text{(correction of the } IR2 \text{ chromatism)} \\ \phi A/v2A + \phi B/v2B + \phi C/v2C = 0 & \text{(correction of the } IR3 \text{ chromatism)}. \end{cases}$$

These equations correct the chromatism in the IR2 band, and in the IR3 band. There may however remain some interband chromatism: the IR2 and IR3 intermediate focal planes of the front objective are not superposed.

The triplet of materials ZnSe(+)/Ge(−)/ZnS(−) is known to ensure an achromatization in the IR2 and IR3 bands. But the use of this triplet leads to powers of ZnSe and ZnS lenses that are much greater than the power of the front group. The user is therefore limited to front groups that are not very powerful or not very open or bulky. If, for example, the power of a triplet of lenses respectively made of ZnSe, Ge and ZnS is 1, the powers of these lenses are respectively approximately 2.7, −0.6 and −1.1. The aperture of the lens made of ZnSe is therefore 2.7 times greater than the aperture of the front group which is already very open.

With the compactness constraints of the invention, the user then has to increase the number of lenses (at least 7) in the front group in order to limit the aperture of each of them to a reasonable value. This large number of lenses significantly increases the cost of the combination. In addition, although the modulation transfer function (MTF) obtained is sufficient in theory, it is considerably degraded as soon as the manufacturing and lens mounting tolerances are taken into account.

According to the invention, the triplets ZnSe(+)/Ge(−)/CaF$_2$(−) or ZnS(+)/Ge(−)/CaF$_2$(−) are used.

CaF$_2$ is rarely used in IR3 because it is absorbent for $\lambda > 10$ μm, whereas most of the IR3 detectors are sensitive up to 12 μm. The QWIP detector used for this imaging system is not sensitive for $\lambda > 10$ μm and therefore allows the use of CaF$_2$.

Since CaF$_2$ has a very weak constringency relative to the other infrared materials, it makes the correction of chromatism very easy. If, for example, the power of a triplet of lenses respectively made of ZnSe, Ge and CaF$_2$ is 1, the powers of these lenses is respectively approximately 1.62, −0.52 and −0.1. If, for example, the power of a triplet of lenses respectively made of ZnS, Ge and CaF$_2$ is 1, the powers of these lenses are respectively approximately 1.64, −0.4 and −0.24. The whole value of this triplet relative to the conventional solution ZnSe(+)/Ge(−)/ZnS(−) can therefore be understood.

The greatest chromatism is corrected in the following manner which represents one embodiment of the invention represented in FIG. 2.

The front group G1 comprises five lenses L1A and L1E.

L1A is preferably made of Ge, divergent, spherical. A lens made of Ge is placed at the front in order to protect the imaging system from outside attack, whether they be of electromagnetic or environmental nature.

The lens made of ZnSe is divided into L1B and L1D; L1B is aspherical in order to correct the spherical aberration.

L1C is made of $CaF_2$.

The assembly L1A to L1D is corrected on the axial chromatism by virtue of the use of the ZnSe/Ge/$CaF_2$ triplet.

L1E is a germanium meniscus. It makes it possible to correct the field curvature, and to help in the pupil conjugation in the narrow-field channel.

The transmission of the $CaF_2$ lens is 96% in IR2 and 80% in IR3 taking account of the absorption of $CaF_2$ in this band and supposing that the lens does not include any antireflection treatment (the refraction index of $CaF_2$ being low, the natural reflectivity of the material is low, whereas a bi-spectral antireflection treatment on this material is considered not to be very effective).

The triplet ZnSe(+)/Ge(−)/$CaF_2$(−) (solution 1) has been used.

But it is also possible to use the triplet ZnS(+)/Ge(−)/$CaF_2$(−) (solution 2).

The solutions 1/ and 2/ are equivalent. The solution 1/ is preferred to the solution 2/ because the $CaF_2$ lens of solution 1 is less powerful than the $CaF_2$ lens of solution 2: therefore potentially, for a similar cost, the MTF of solution 1 is greater than the MTF of solution 2.

The chromatism was corrected on the group G1 mainly responsible for the chromatism. This correction may be enhanced by also correcting the chromatism of the other groups G2 and G3.

Since the value of the aperture radius is relatively small on each of the lenses L2, L3A and L3B of the groups G2 and G3 relative to the semi-diameter of the entrance pupil, the contribution of these lenses to the chromatism of the combination is intrinsically small. It is therefore sufficient to produce these components in a material that is not very chromatic in each of the useful bands. The best candidate is germanium.

L2, L3A and L3B are made of germanium. L2 and L3A are aspherical, L3B is spherical.

However, to improve the MTF, it is useful to reduce the chromatism introduced by L3A. A perfect correction with a triplet is not necessary: it is possible to use a doublet of material. These doublets are computed based on the following equations:

As above, $\phi$ is the power of the optical module, in this instance L3A, $\begin{cases} \phi A, \phi B \text{ the respective powers of the 2 optical components,} \\ \nu 1A \text{ and } \nu 2A \text{ the } IR2 \text{ and } IR3 \text{ constringencies of the component } A, \\ \nu 1B \text{ and } \nu 2B \text{ the } IR2 \text{ and } IR3 \text{ constringencies of the component } B, \\ \lambda 1 \text{ is the peak sensitivity wavelength of the } IR2 \text{ band,} \\ \lambda 2 \text{ is the peak sensitivity wavelength of the } IR3 \text{ band.} \end{cases}$ $\nu 1$ and $\nu 2$ are the equivalent constringencies of the doublet in the IR2 and IR3 spectral bands.

They are defined by the following equation:

$$\phi/\nu i = \phi A/\nu iA + \phi B/\nu iB \text{ where } i=1 \text{ or } 2.$$

The equations that make it possible to compute the powers $\phi A$ and $\phi B$ are as follows:

$$\begin{cases} \phi = \phi A + \phi B \\ 1/\lambda 1 * (\phi A/\nu 1A + \phi B/\nu 1B) = -1/\lambda 2 * (\phi A/\nu 2A + \phi B/\nu 2B). \end{cases}$$

These equations ensure that the normal axial chromatism difference will be the same number of wavelengths in each of the two respective spectral bands.

The best candidate doublets for L3A are summarized in the table below. They are classified in ν1 order in decreasing absolute value.

| $\sqrt{\phi A^2 + \phi B^2}$ | A | ν1A | ν2A | B | ν1B | ν2B | φA | φB | ν1 | ν2 |
|---|---|---|---|---|---|---|---|---|---|---|
| 0.99 | IG4 | 388 | 676 | DOE* | −4 | −7 | 0.99 | 0.009 | −25985 | 13967 |
| 0.99 | GASIR1 | 395 | 472 | DOE* | −4 | −7 | 0.99 | 0.01 | −3198 | 1719 |
| 0.99 | GE | 240 | 1900 | DOE* | −4 | −7 | 0.99 | 0.01 | 1418 | −762 |
| 2.22 | ZNS | 186 | 97 | ZNSE | 322 | 232 | −0.99 | 1.99 | 1157 | −622 |
| 1.08 | ZNSE | 322 | 232 | CAF2 | 33 | 13 | 1.08 | −0.08 | 1070 | −575 |
| 1.19 | ZNS | 186 | 97 | CAF2 | 33 | 13 | 1.18 | −0.18 | 982 | −528 |
| 1.05 | CAF2 | 33 | 13 | GASIR1 | 395 | 472 | −0.05 | 1.05 | 937 | −504 |

*DOE = Diffractive Optical Element

For correcting the chromatism of L3A, the best doublet is IG4/DOE. The Ge/DOE doublet is also a good candidate, by virtue of the high refraction index of germanium.

For the ZnSe/ZnS doublet the powers of the lenses are considerable. It may be suitable for a group that is not very open, if it is desired to prevent diffractive elements.

The imaging system according to the invention may be incorporated into an IR camera, into IR binoculars or into another item of IR optronic equipment. It may be installed in a tank gun sight, in a Forward-Looking Infra-Red system or FLIR, or in a pod installed on an aircraft.

Figure 3:
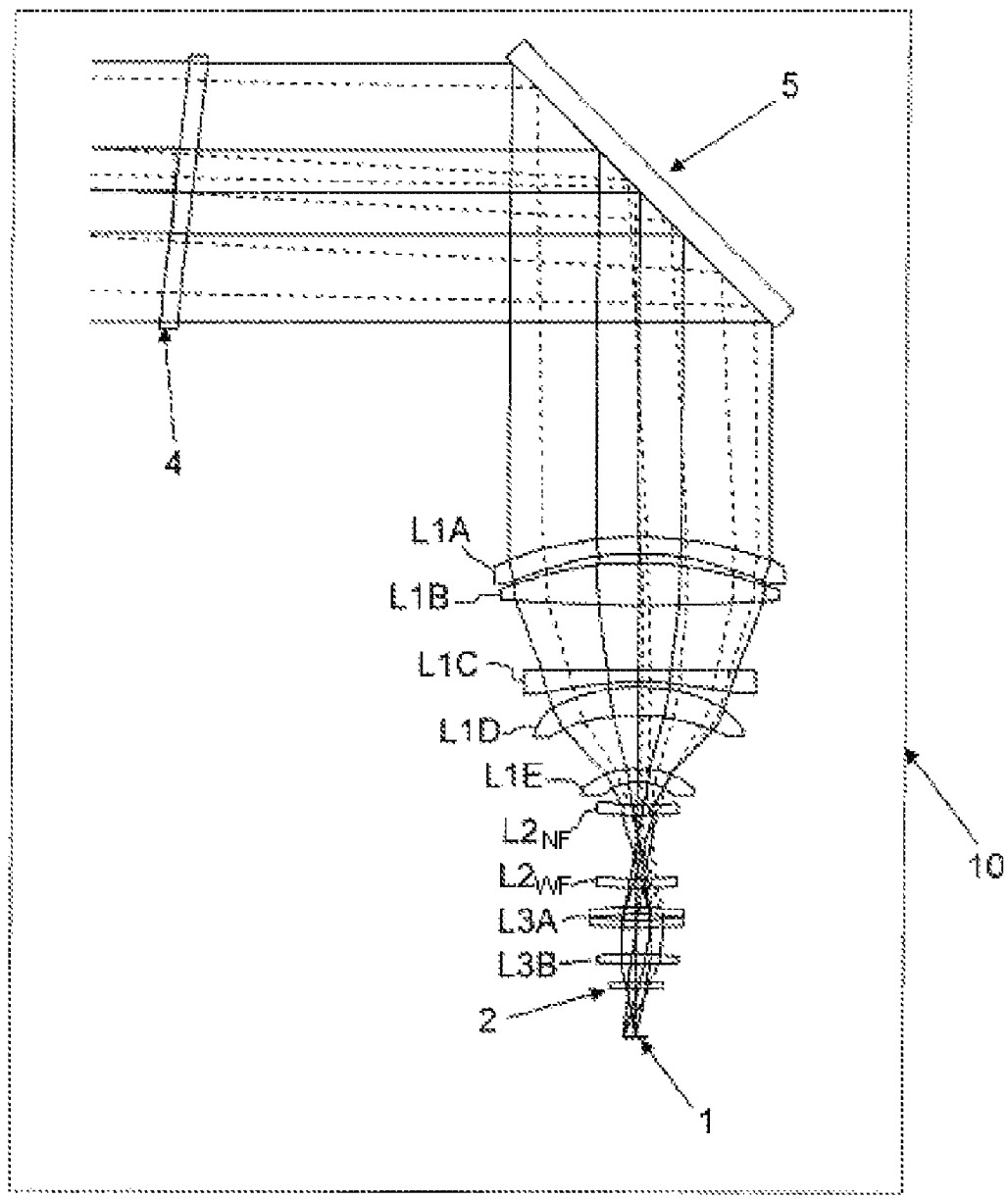
FIG. 3 represents schematically a tank gun sight comprising an imaging system according to the invention.

FIG. 3 represents such an installation in a tank gun sight. The various operating modes of the camera (IR2 & IR3, NF & WF) have been superposed on the same figure. The tank gun sight 10 comprises a germanium window 4 usually placed so as to prevent any narcissus effect, and a gyrostabilized mirror 5. FIG. 3 makes it possible to understand why it is of value to make the imaging system upstream of the first system lens compact: it makes it possible to reduce the size of the window 4 and of the gyrostabilized mirror 5.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A dual-field (NF and WF) imaging system comprising an optronic detector and an optical combination of narrow-field focal length $F_{NF}$ having, on an optical axis:
    a front lens,
    a narrow-field entrance pupil situated in the vicinity of the front lens,
    a real wide-field entrance pupil, situated upstream of the front lens,
    an intermediate focal plane (IFP),
    the optical combination comprising, on the optical axis, the following refractive groups:
    a convergent front group G1 of focal length F, where $F<F_{NF}/2$, this group G1 comprising the front lens,
    a divergent field-change group G2 that can move along the optical axis, this group being situated upstream of the IFP in NF configuration and downstream of the IFP in WF configuration,
    a relay group G3 imaging the IFP on the focal plane of the detector,
    wherein the detector is a cooled IR2/IR3 detector, and in that, since the refractive groups comprise lenses, at least three different materials including $CaF_2$ are used for the lenses of the front group G1.

2. The imaging system as clamed in claim 1, wherein the triplets ZnSe(+)/Ge(−)/CaF$_2$(−) or ZnS(+)/Ge(−)/CaF$_2$(−) are used in the front group G1.

3. The imaging system as claimed in claim 1, wherein the front group comprises 5 lenses.

4. The imaging system as claimed in claim 1, wherein the front group comprises two lenses made of Ge, two lenses made of ZnS or ZnSe, and one lens made of CaF$_2$.

5. The imaging system as claimed in claim 1, wherein the group G2 comprises one lens made of Ge.

6. The imaging system as claimed in claim 1, wherein the relay G3 comprises lenses made of Ge.

7. The imaging system as claimed in claim 1, wherein the relay G3 comprises at least one diffractive lens.

8. The imaging system as claimed in claim 1, wherein the relay G3 comprises at least one lens that can move along the optical axis.

9. The imaging system as claimed in claim 1, wherein the relay G3 comprises at least one microscanning lens making it possible to translate the image on the detector.

10. The imaging system as claimed in claim 1, wherein the detector is a linear or matrix detector.

11. The imaging system as claimed claim 10, wherein the detector is a multiple quantum well matrix detector.

12. The imaging system as claimed in claim 1, wherein the imaging system has a cold screen, the cold screen forms an aperture diaphragm.

13. The imaging system as claimed in claim 1, wherein the imaging system has an aperture diaphragm, only this diaphragm limits the optical beams in order to prevent vignetting.

14. The imaging system as claimed in claim 1, wherein the optronic detector is configured to capture an image of an object upstream of the front lens.

15. Binoculars comprising a dual-field (NF and WF) imaging system comprising an optronic detector and an optical combination of narrow-field focal length $F_{NF}$ having, on an optical axis:
    a front lens,
    a narrow-field entrance pupil situated in the vicinity of the front lens,
    a real wide-field entrance pupil, situated upstream of the front lens,
    an intermediate focal plane (IFP),
    the optical combination comprising, on the optical axis, the following refractive groups:
    a convergent front group G1 of focal length F, where $F<F_{NF}/2$, this group G1 comprising the front lens,
    a divergent field-change group G2 that can move along the optical axis, this group being situated upstream of the IFP in NF configuration and downstream of the IFP in WF configuration,
    a relay group G3 imaging the IFP on the focal plane of the detector,
    wherein the detector is a cooled IR2/IR3 detector, and in that, since the refractive groups comprise lenses, at least three different materials including $CaF_2$ are used for the lenses of the front group G1.

16. A tank gun sight comprising A dual-field (NF and WF) imaging system comprising an optronic detector and an optical combination of narrow-field focal length $F_{NF}$ having, on an optical axis:
    a front lens,
    a narrow-field entrance pupil situated in the vicinity of the front lens,
    a real wide-field entrance pupil, situated upstream of the front lens,
    an intermediate focal plane (IFP),
    the optical combination comprising, on the optical axis, the following refractive groups:
    a convergent front group G1 of focal length F, where $F<F_{NF}/2$, this group G1 comprising the front lens,
    a divergent field-change group G2 that can move along the optical axis, this group being situated upstream of the IFP in NF configuration and downstream of the IFP in WF configuration,
    a relay group G3 imaging the IFP on the focal plane of the detector,
    wherein the detector is a cooled IR2/IR3 detector, and in that, since the refractive groups comprise lenses, at least three different materials including $CaF_2$ are used for the lenses of the front group G1.

* * * * *